F. F. MARSH & A. F. THOMPSON.
Nursing-Apparatus.
No. 163,022.
Patented May 11, 1875.
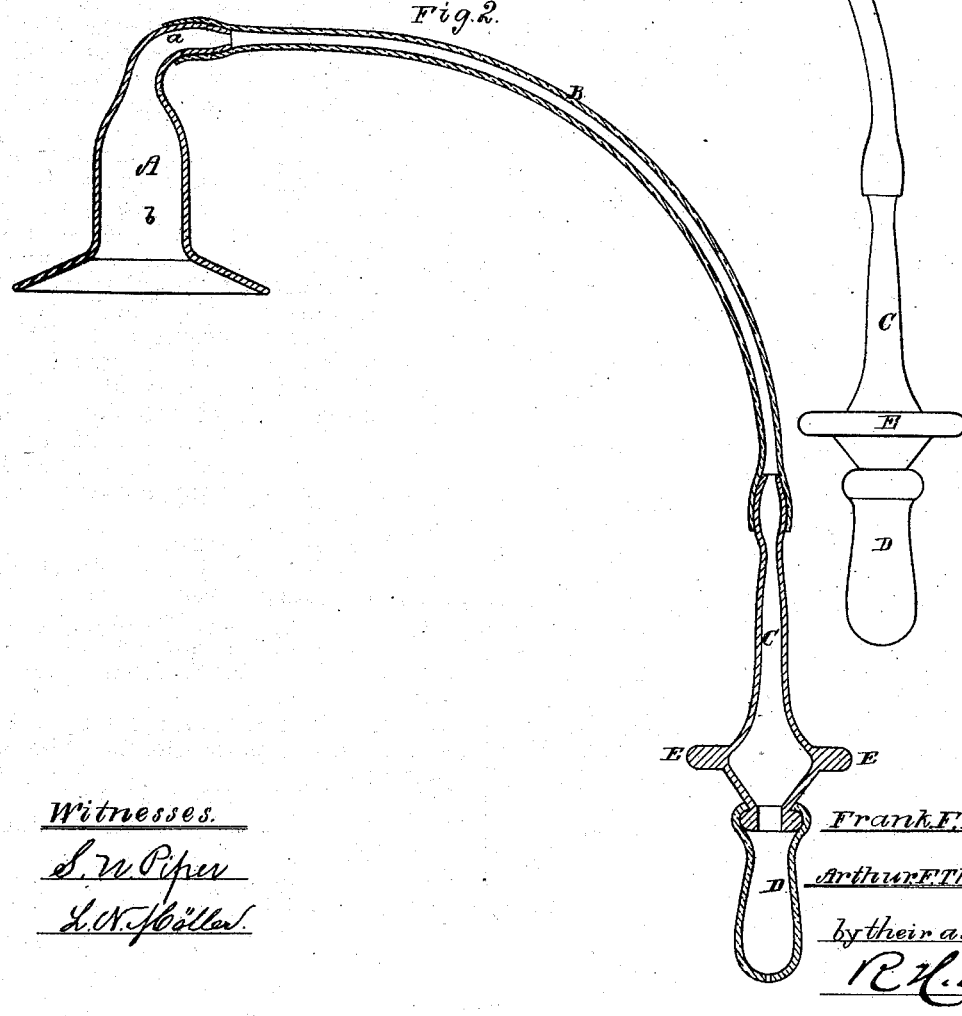

UNITED STATES PATENT OFFICE.

FRANK F. MARSH AND ARTHUR F. THOMPSON, OF BOSTON, MASS.

IMPROVEMENT IN NURSING APPARATUS.

Specification forming part of Letters Patent No. 163,022, dated May 11, 1875; application filed April 8, 1875.

*To all whom it may concern:*

Be it known that we, FRANK F. MARSH and ARTHUR F. THOMPSON, of Boston, of the county of Suffolk and State of Massachusetts, have invented a new and useful or Improved Nursing Apparatus, or "Lacto-Extractor;" and do hereby declare the same to be fully described in the following specification, and represented in the accompanying drawings, of which—

Figure 1 is a side view, and Fig. 2 a longitudinal section, of it.

Our invention relates to a nursing apparatus provided with a means of indicating the flowage of milk through it when the apparatus may be in use; also, to a milk-notor and mouth-guard arranged and formed in one piece, as hereinafter described.

In such drawings, A denotes a nipple or breast-cap, composed of glass, and of the form represented, it having its nozzle or branch pipe *a* curved or bent down at, or nearly at, a right angle to the axis of the bell portion *b*, all as shown. On this branch pipe a vulcanized india-rubber tube, B, is fixed by the pipe being inserted tightly into one end of the said tube. The tube B at its opposite end fits in like manner on what we term the "milk-notor" C, which is a glass or trumpet tube, having fixed on its other end an artificial nipple, D. The said tube has a circular guard, E, extending from it, and around it concentrically, and formed in one piece with it, such guard being to prevent the nipple from being swallowed by an infant, or getting down his mouth, so as to choke him.

The milk-notor is to enable a person or nurse to ascertain at any time whether the child may be drawing or sucking milk into the nipple, or being fed, as, by being of glass and transparent, such milk-notor will expose the milk to view while it may be passing through it to the nipple.

By having the guard of glass, and in one piece with the notor-tube, it can be easily cleaned, and is far better than a wooden guard fixed upon the nipple, as, when so applied, the guard is liable to cramp the nipple and prevent a full draft of the fluid through it.

Furthermore, by having the discharge-nozzle of the breast-cap curved or bent, in manner as represented, the tube extending therefrom cannot be suddenly bent and contracted, so as to intercept the flow of milk, as it would be liable to be were the nozzle straight, as it has heretofore been customary to make it.

The mode of using the apparatus will readily be understood.

We claim as our invention—

1. The combination of the milk-notor C (or glass piece arranged between the nipple and the elastic tube, to indicate the flow of milk from the tube to the nipple) with the nipple D, the tube B, and the breast-cap A, all being arranged as specified.

2. The milk-notor, as provided with the guard E in one piece with the tube, all as represented.

FRANK F. MARSH.
ARTHUR F. THOMPSON.

Witnesses:
R. H. EDDY,
J. R. SNOW.